UNITED STATES PATENT OFFICE.

PIERRE PROSPER MONNET, OF LYONS, FRANCE, ASSIGNOR TO LA SOCIÉTÉ CHIMIQUE DES USINES DU RHÔNE ANCIENNEMENT GILLIARD, P. MONNET ET CARTIER, OF SAME PLACE.

PROCESS OF MAKING AROMATIC ALDEHYDES.

SPECIFICATION forming part of Letters Patent No. 613,460, dated November 1, 1898.

Application filed April 29, 1898. Serial No. 679,173. (No specimens.)

*To all whom it may concern:*

Be it known that I, PIERRE PROSPER MONNET, of Lyons, France, have invented certain new and useful Improvements in the Production of Aromatic Aldehydes, of which the following is a specification.

Hitherto the conversion of methyl derivatives of the aromatic hydrocarbons into aromatic aldehydes has been ordinarily effected in the following way, which may be described as an indirect method: The $CH_3$ of the lateral chain has been converted by the action of chlorin into $X-CH_2Cl$ or $X-CHCl_2$, and the aldehydes have been produced from those chlorination products by subsequent oxidation. Apart from the cost of chlorination this process has the drawback that a certain amount of chlorin or chlorinated products enters into the aromatic nucleus, and the removal of these products generally presents difficulties. In some cases—*e.g.*, in the manufacture of benzaldehyde—this drawback is not of much consequence, but in others—*e. g.*, in the manufacture of toluylic aldehydes—it is very appreciable.

I have discovered that aldehydes can be produced by direct oxidation if care is taken that the oxidizing agent is always in the presence of a large excess of the $CH_3$ compound, and this constitutes the characteristic feature of the present invention. Hitherto the direct oxidation of the $CH_3$ of aromatic compounds has practically always yielded carboxylic acids. By this simple expedient discovered by me the further progress of the oxidation—*i. e.*, the formation of carboxylic acid—can be almost completely prevented.

The reaction which I have discovered is capable of general application.

Up to the present I have obtained the best results by the use of freshly-precipitated manganese binoxid or Weldon mud and sulfuric acid as the oxidizing agent; but according to my experience other suitable oxidizing agents may also be employed, care being always taken to have a large excess of the product to be oxidized at the close of the reaction.

The following examples may serve to illustrate the method of application of this new process of manufacture. The best yields have been obtained under the conditions and with the proportions stated; but the conditions, especially the concentration of the acid and the temperature, may be varied within wide limits.

Example 1: Benzaldehyde, three hundred kilograms of toluol, and seven hundred kilograms of sulfuric acid of sixty-five per cent. are mixed together in an apparatus fitted with a stirring device, and ninety kilograms of manganese binoxid are slowly added in the form of a fine powder during vigorous stirring. The temperature is maintained at about 40° centigrade. After all the binoxid of manganese has been added the stirring device is kept in operation for some time in order to complete the reaction. The mixture of benzaldehyde and toluol is then distilled with steam, and the separation is effected in the well-known manner.

Example 2: Toluyaldehyde, (O.M.P.) The xylenes are treated as stated in Example 1 at a temperature of about 25°. The oxidation takes place more readily than in the case of toluol.

The process of manufacture discovered by me can also be applied to produce substituted aldehydes. For example, orthochlorbenzaldehyde can be easily produced by treating orthochlortoluene according to the method described in Example 1.

Nitro derivatives of the hydrocarbons, such as nitrotoluene and nitroxylene, also yield the corresponding aldehydes. The behavior of the hydroxyl derivatives toward oxidizing agents under the above conditions varies. Thus the methyl ether of paracresol gives an aldehyde without difficulty, while the orthocresol compounds give no aldehyde under the same conditions.

The sulfonic derivatives of aromatic hydrocarbons, their chlorids, amids, and esters, as well as the acetylated and methylated amido derivatives, give no aldehydes under the same conditions.

What I claim, and desire to secure by Letters Patent, is—

1. The process of manufacturing aromatic aldehydes by the direct oxidation of the methyl group in compounds of the aromatic hydrocarbon series, which process consists in treating the said compound with an oxidizing agent in the presence of a large excess of the said compound and separating from the unaltered material the aldehyde produced, substantially as described.

2. The process of aldehydation of the methyl group in compounds of the aromatic hydrocarbon series, which process consists in the treatment of the said compound with an oxidizing agent in such a proportion that the oxidizing agent is insufficient for the oxidation of the total methyl to aldehyde and subsequently in separating from the unaltered material the aldehyde produced.

3. The process of manufacturing nitrobenzaldehyde by the direct oxidation of the methyl group of nitrotoluene which process consists in treating nitrotoluene with manganese binoxid (Weldon mud) and sulfuric acid in the proportions and substantially at the temperature substantially as described.

In witness whereof I have hereunto signed my name in the presence of two subscribing witnesses.

PIERRE PROSPER MONNET.

Witnesses:
RODOLPHE PFISTER,
MARIUS TACHON.